United States Patent [19]

Hendry

[11] Patent Number: 4,948,547
[45] Date of Patent: Aug. 14, 1990

[54] METHOD FOR THE USE OF GAS ASSISTANCE IN THE MOLDING OF PLASTIC ARTICLES

[75] Inventor: James W. Hendry, Brooksville, Fla.

[73] Assignee: Michael Ladney, Sterling Heights, Mich.

[21] Appl. No.: 408,921

[22] Filed: Sep. 18, 1989

[51] Int. Cl.$^5$ .................... B29C 45/00; B29C 45/34; B29C 45/38

[52] U.S. Cl. .................... 264/500; 264/154; 264/155; 264/161; 264/328.1; 264/328.12; 425/812

[58] Field of Search ............ 264/154, 155, 161, 328.1, 264/328.12, 500; 425/812

[56] References Cited

U.S. PATENT DOCUMENTS

| | | | |
|---|---|---|---|
| 2,435,610 | 2/1948 | Schneider | 264/500 X |
| 4,101,617 | 7/1978 | Friederich | 264/155 X |
| 4,830,812 | 5/1989 | Kauer | 264/161 X |

OTHER PUBLICATIONS

Rusch, K. C. "Gas-Assisted Injection Molding—The New Thermoplastic Molding Technology for Exterior Body Panels".

Primary Examiner—Jeffery Thurlow
Assistant Examiner—Leo B. Tentoni
Attorney, Agent, or Firm—Brooks & Kushman

[57] ABSTRACT

A method of gas-assisted injection molding in which a charge of pressurized gas is injected into the mold, but not into the article-defining cavity. The gas charge is of a predetermined quantity and pressure sufficient to assist in filling out the article-defining cavity with resin and promoting surface quality. In another feature, the gas pressure within the resulting molding may be relieved by separating the mold halves and permitting the gas-containing portion of the molding to self-rupture, or by means well known in the art.

10 Claims, 2 Drawing Sheets

METHOD FOR THE USE OF GAS ASSISTANCE IN THE MOLDING OF PLASTIC ARTICLES

TECHNICAL FIELD

This invention relates to a method of plastic injection molding, and, more particularly, a method in which pressurized gas is used to assist in the molding process.

BACKGROUND ART

The use of pressurized gas to assist in a conventional plastic injection molding process is believed to have been first made commercially practicable by the invention of Friederich disclosed in U.S. Pat. No. 4,101,617, issued Jul. 18, 1978. The Friederich patent addressed the problem of molding hollow shaped bodies in a single injection molding operation, and taught a practicable method of introducing compressed gas along with, or just after, the injection of molten plastic resin into the article-defining cavity. Moreover, the Friederich patent solved the concern of de-pressurizing or relieving the molded article by nozzle separation. The early work of Friederich was directed to the molding of such utilitarian articles as clear plastic architectural bricks and the like. More recently, the patented Friederich process has been adapted to the molding of hollow plastic articles of various shapes and dimensions.

In its early years, the use of pressurized gas in assistance to a conventional plastic injection mold process was not recognized for all of the functional attributes which it is known to enjoy today. More specifically, during those early years, the industry gave greater focus to the use of structural foam as a specialty process for molding relatively thick-sectioned articles which would be light in weight and have acceptable surface finish, i.e., avoid sink marks associated with the conventional plastic injection molding. The range of potential applications of structural foam molding of thermoplastic materials was limited, however, due to certain inherent features of such process. Among such features included, the relatively long cycle times required to cool the plastic in the mold (the foam cells serve to insulate heat transfer), and the problem of surface finish (splay, blister and swirl) associated with the foamed, molten plastic resin contacting the cool surface walls of the article-defining cavity.

In recent years, attention has returned to the use of gas assistance with conventional plastic injection molding to attain the product quality and productivity which had been hoped for with structural foam molding. The features of surface quality, lower clamp tonnage, rapid cycle times, weight reduction, material saving and minimization of part distortion or warpage can all be obtained with proper utilization of gas assistance with a conventional plastic injection molding process. The paper titled "GAS-ASSISTED INJECTION MOLDING —THE NEW THERMOPLASTIC MOLDING TECHNOLOGY FOR EXTERIOR BODY PANELS" by Dr. Ken C. Rusch, presented at the 1989 meeting of the Society of Automotive Engineers on Mar. 2, 1989, discusses in greater detail the relevant history of the use of gas-assistance in connection with plastic injection molding.

The impetus for the present invention was the inventor's assignment to realize the successful plastic injection molding of an automobile headlamp cover. This type of cover pivots between an open position to reveal the headlamp lens, and a closed position to conceal the headlamp lens to enhance the design aesthetics and aerodynamic profile of the automobile. The structure of the headlamp cover comprises a substantially planar panel which is intended to appear flush and continuous with the front end body panels when the cover is in the closed position. The planar section is mounted by a pair of flange arms integrally joined at the opposed ends. Each flange arm extends perpendicularly to the substantially planar cover portion.

The inventor's objective was to realize the headlamp cover as a plastic molded part to replace a conventional die-cast metal part. The die-cast metal part is relatively heavier and requires a higher rated motor or actuator to move the headlamp cover between its open and closed positions. Also, the die-cast cover has thermal cycling problems, and cannot withstand passage through the factory paint ovens where temperatures may reach or exceed 400° F. without experiencing permanent deformation. The die-cast metal part thus has the further drawback of requiring installation in a secondary, off-line operation which added to the cost and complexity of automated automobile assembly.

There were several practical problems facing the inventor in realizing the headlamp cover design in a plastic molded piece. First, the exterior surface of the substantially planar portion of the headlamp cover had to be "Class A" quality and be paintable in the automated line. Any surface degradation due to sink marks, blemishes or other imperfections were unacceptable for commercial standards. Second, the headlamp cover could not have warpage or distortion across its substantially planar surface no matter the microscopic smoothness of the surface. Third, the dimensional integrity of the flange arms was critical to ensure safe and consistent mechanical operation of the headlamp cover when actuated between its closed and open positions. Fourth, the part had to be filled out, i.e., the part design had to be such that it could be filled out on a regular production basis within processing temperatures which do not cause degradation of the resin composition and at injection pressures which do not create molecular shear forces in the resin which would reduce the mechanical strength of the finished article. The part had been exhaustively molded in conventional plastic injection molding processes on a prototype development basis without desired success.

The dilemma facing the inventor can be simply put as follows: (i) too little plastic injection pressure would risk inferior surface quality and non-fillout of the part; (ii) too high of an injection pressure and/or injection speed would risk molecular shearing of the material and cause molded-in stress which is manifested by distortion and lack of strength; and (iii) too great of a resin temperature would decrease the viscosity of the molten resin but risk exceeding the material processing temperature and cause material degradation and dehomogenization of any filler material, such as impregnated glass.

The solution to the inventor's dilemma proved to be the use of gas-assistance in plastic injection molding the headlamp cover. However, the design did not admit to having the gas enter the article-defining cavity and form hollow portions or channels in the finished part. The substantially planar portion of the headlamp cover was required to be of continuous cross-sectional thickness, and the presence of gas channels, as well as the possibility of gas permeation outside of the channels, was unacceptable as a matter of customer dictated part design.

Moreover, after a number of attempts to design the headlamp cover part with gas channels in selected positions, it was found that the mechanical strength of the cover may be compromised if gas channels were present, especially at the integral lines of joinder of the flange arms to the cover panel. The inventor's solution then turned to the novel type of gas assisted plastic injection molding process which is summarized presently.

DISCLOSURE OF THE INVENTION

The present invention is a plastic injection molding process which uses pressurized gas to assist in the formation of the molding in the article-defining cavity, but in which gas does not enter into the article-defining cavity. In this application, a charge of gas is injected into a mold and is selected to be of quantity and pressure sufficient to enter into a volume substantially contiguous to the article-defining cavity to assist in the fillout of the cavity with molten resin.

The molten plastic may be injected at a pressure which does not introduce molded-in stresses into the plastic at the molecular level. The pressure of the gas in the volume continuous to the article-defining cavity permits a direct and controlled pressure application on the fluent resin in the article-defining cavity. The gas assistance thereby aids in the surface quality by maintaining intimate contact of the resin with the mold walls defining the cavity while the resin cools, i.e., shrinkage of the resin is resisted. A further advantage of the present inventive process is that depressurization or relieving the gas pressure of the mold does not affect the plastic within the article-defining cavity. The introduction of the gas may be accompanied by various means well known in the art.

The substantially contiguous volume containing the gas may be a runner in the mold, and the relieving step may be accomplished by separating the mold halves and permitting the runner to self-rupture. Alternatively, the runner may be pierced, sheared or opened by a like mechanical operation to relieve the pressure in the mold, or by other means well known in the art.

Further objects and features of the present invention will be made known in the following description of the best mode for carrying out the invention.

BEST MODE FOR CARRYING OUT THE INVENTION

Figure 1:
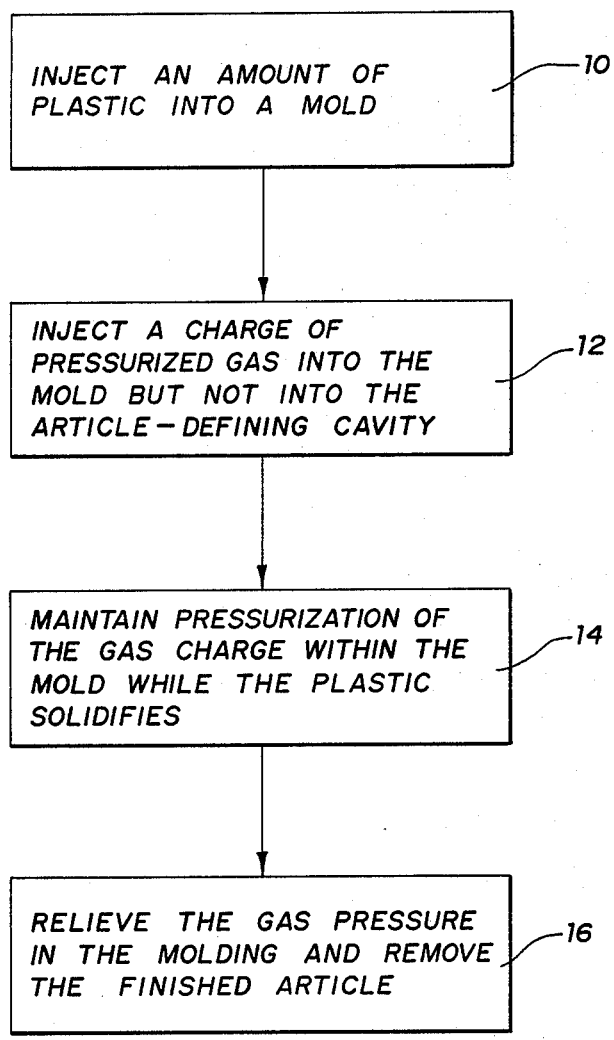
FIG. 1 is a process flowchart showing the operative steps of the novel molding process of the present invention.
Figure 2:
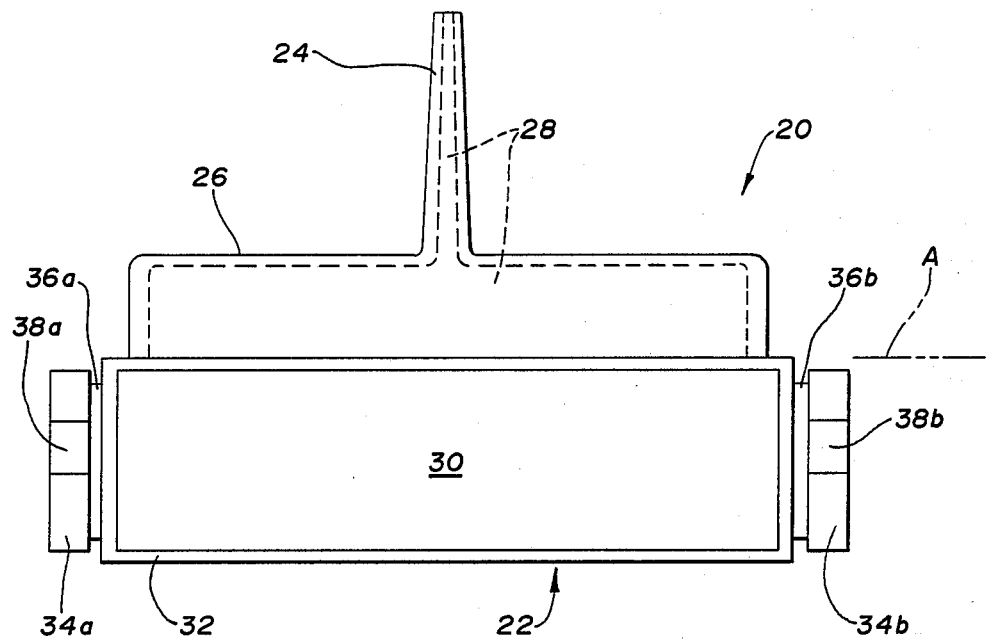
FIG. 2 is a schematic view of a full-shot molding specimen produced in accordance with the process of the present invention.

FIG. 1 discloses the general sequence of steps involved in carrying out the method of the present invention. FIG. 2 is a schematic illustration of an exemplary full-shot molding, indicated generally at 20, of a headlamp lens cover of the type referred to in the proceeding discussion. The following description of the invention will correlate the method steps of FIG. 1 with corresponding structure of FIG. 2 to facilitate the disclosure. As a prefatory note, the general principles of gas-assisted injection molding are disclosed in the basic patent to Friederich, U.S. Pat. No. 4,101,617, issued Jul. 18, 1978. The present invention is an improvement based on the Friederich disclosure which addressed the basic problems of coordinating the introduction of molten plastic and pressurized gas into the mold and thereafter venting the interior of the hollow molded article on a predictable, repeatable basis to produce articles with superior surface quality on a commercial basis.

With reference to FIG. 1, in step 10, a charge or amount of molten plastic resin is injected into an injection aperture of a mold in an injection molding system. In the application of FIG. 2, the quantity of resin is sufficient to fill out the article-defining cavity of the mold and a portion of the volume defined by a sprue 24 and a runner 26 of the molding 20. The sprue 24 and the runner 26 help to define a resin flow path which extends between the injection aperture and the article-defining cavity.

In this case, the article-defining cavity is the volume along reference line "A" which defines the shape of the finished article. The finished article is a headlamp lens cover indicated generally at 22. The cover 22 comprises a substantially planar panel 30 which has a perimeter frame 32 of thicker cross section. A pair of mounting flanges 34a and 34b are attached integrally at the opposite lateral ends of the panel 30 by respective webs 36a and 36b. The center portions of the mounting flanges 34a and 34b include notches 38a and 38b configured to couple with actuator arms on the servo mechanism which would pivot the lens 22 between its open and closed positions.

The exterior surface of the planar panel 30 must be free of imperfections to meet automotive company standards on Class A surface finish. Also, the panel must be free of warpage or deformation over its surface area to ensure proper fit and appearance when assembled on the automobile.

The mounting flanges 34a and 34b must be integrally joined to the panel 30 in true perpendicular relation. A deviation from perpendicular relation will bias the mounting flanges 34a and 34b from a proper mechanical coupling to the actuator arms for the headlamp lens cover 22. Moreover, the mounting flanges 34a and 34b must have a reasonably strong mechanical connection to the panel 30 through webs 36a and 36b.

Accordingly, in step 10, the charge of plastic resin is injected at a pressure sufficient to nominally fill out the article-defining cavity without any gas entry into the cavity but not so great as to introduce microscopic stresses within the plastic which will cause warpage upon removal of the article from the mold cavity or during subsequent thermal cycling of the article. The temperature of the plastic charge is within the range of processing temperatures for the resin composition to ensure sufficient fluidity of the plastic charge. However, the plastic injection temperature cannot be so great as to cause shearing or burning of the resin composition, and consequent degradation of the material, including dehomogenization due to separation of filler materials.

In step 12, a charge of pressurized gas is injected into the injection aperture through the sprue 24 and into the runner 26. However, the charge of gas is selected to be of a pressure and quantity sufficient to avoid entry of the gas into the article-defining cavity. The volume available to the gas is indicated schematically at 28. The specific pressure and quantity of gas required must be determined on a job-by-job basis through an iterative trial procedure in the course of normal trial moldings.

Figure 3:
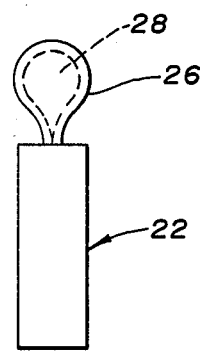
FIG. 3 is a side view of a bulbous runner and lens cover of FIG. 2.

In the case of the headlamp lens cover 22, the runner 26 is shaped to accommodate a substantial quantity of pressurized gas to assist in the molding process. As illustrated in FIG. 3, the runner 26 may have a bulbous cross section, i.e. somewhat in the shape of an inverted water droplet, to facilitate the entry of gas into the runner and containment from the article-defining cavity.

The presence of pressurized gas in the volume indicated at 28 assists in the fill out of the article-defining cavity with molten resin to avoid the need for relatively high plastic injection pressure.

In step 14, the pressurized gas is maintained in the volume 28 while the plastic solidifies within the article-defining cavity. The presence of the pressurized gas during solidification urges the plastic into intimate contact with the walls of the article-defining cavity to promote surface quality. The gas pressure counters the normal tendency of the plastic to shrink while cooling and leave blemishes in the surface of the finished article.

In step 16, the molding 20 is depressurized by relieving the pressure in the molding 20 and the finished article is removed. The depressurization can occur autogenuously by separation of the mold halves and self-rupturing of the runner 26. The self-rupturing facilitates the molding process by avoiding the need for a separate depressurization operation. For example, in some types of gas-assisted molding processes, the interior of the molding is vented through a gas recovery step involving timers, valves and a reservoir. In this case, the bulbous cross-sectional shape of the runner 26 admits to self-rupture upon separation of the mold halves.

Alternatively, the molding 20 may be depressurized before separation of the mold halves by piercing, shearing or a like mechanical operation applied to the sprue 24 or the runner 26 or by nozzle retraction.

Upon depressurization or relieving the molding, the full-shot molding 20 is removed from the mold. The appendages of the runner 26 and the sprue 28 may be separated from the finished article 22 in accordance with conventional operations.

The invention has been described in an illustrative manner, and, it is to be understood that, the terminology which has been used is intended to be in the nature of the words of description, rather than of limitation.

Obviously, many modifications and variations of the present invention are possible in light of the above teachings. It is, therefore, to be understood that, within the scope of the appended claims, the invention may be practiced otherwise than as specifically described.

I claim:

1. An improved method for the use of gas-assistance in the molding of a plastic article in an injection molding system including a mold having an injection aperture, the method comprising the steps of:
   injecting an amount of molten plastic resin sufficient for the preparation of the plastic article through the injection aperture and along a resin flow path which extends from the injection aperture to an article-defining cavity in the mold;
   injecting a charge of pressurized gas into the mold, said gas charge being of pressure and quantity sufficient to enter the resin flow path but not into the article-defining cavity;
   maintaining the gas charge under pressure within the mold while the plastic resin solidifies within the article-defining cavity; and
   relieving the gas pressure within said resin flow path.

2. The method as described in claim 1 wherein the step of relieving the molding comprises separation of mold halves of the mold to cause self-rupture of the plastic resin containing the pressurized gas in the resin flow path.

3. The method as described in claim 1 wherein the step of relieving the molding includes the step of opening the resin flow path to permit ventilation of the gas contained therein.

4. The method as described in claim 3 wherein the step of opening includes the step of piercing the plastic resin to form an aperture therein.

5. The method as described in claim 3 wherein the step of opening includes the step of shearing the plastic resin to ventilate the gas contained therein.

6. A method for injection molding of a plastic article having at least one substantially planar portion in an injection molding system including a mold having an injection aperture, the method comprising the steps of:
   injecting an amount of molten plastic resin sufficient for the preparation of the plastic article through the injection aperture and along a resin flow path which extends from the injection aperture to an article-defining cavity, said resin flow path including a portion which is substantially contiguous to a portion of the article-defining cavity corresponding to the substantially planar portion;
   injecting a charge of pressurized gas into the mold, said gas charge being of pressure and quantity sufficient to enter into a contiguous portion of the resin flow path contiguous to the portion of the article-defining cavity corresponding to the substantially planar portion, and not into the article-defining cavity;
   maintaining the gas charge under pressure in the contiguous portion during solidification of the plastic resin within the article-defining cavity; and
   relieving the gas pressure within said contiguous portion preparatory to removing said plastic article from the mold.

7. The method as described in claim 6 wherein the step of relieving the molding includes separating mold halves of the mold to permit self-rupturing of the portion of the resin flow path contiguous to the portion of the article-defining cavity corresponding to the substantially planar portion.

8. The method as described in claim 6 wherein the step of relieving the molding includes the step of opening the resin flow path contiguous to the portion of the article-defining cavity defining the substantially planar portion to permit ventilation of the gas contained therein.

9. The method as described in claim 8 wherein the step of opening includes the step of piercing the plastic resin to form an aperture therein.

10. The method as described in claim 8 wherein the step of opening includes the step of shearing the plastic resin to permit ventilation of the gas contained therein.

* * * * *